United States Patent
Chen et al.

(10) Patent No.: US 7,065,662 B2
(45) Date of Patent: Jun. 20, 2006

(54) INFORMATION HANDLING SYSTEM FEATURING A POWER-BASED CURRENT LIMITING CIRCUIT

(75) Inventors: Kevin Y. Chen, Round Rock, TX (US); Nikolai V. Vyssotski, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 503 days.

(21) Appl. No.: 10/385,096

(22) Filed: Mar. 10, 2003

(65) Prior Publication Data

US 2004/0181697 A1 Sep. 16, 2004

(51) Int. Cl.
*G06F 1/26* (2006.01)
(52) U.S. Cl. ............ 713/300; 713/320; 713/322; 713/323; 713/324; 713/330; 713/340; 307/98; 307/100; 307/125; 307/127
(58) Field of Classification Search ........... 713/300, 713/340, 320–324, 330; 307/98, 100, 125, 307/127
See application file for complete search history.

(56) References Cited

U.S. PATENT DOCUMENTS

| | | | |
|---|---|---|---|
| 5,777,834 A * | 7/1998 | Lehner et al. | 361/66 |
| 5,877,633 A | 3/1999 | Ng et al. | |
| 6,154,057 A | 11/2000 | Shao et al. | |
| 6,472,855 B1 * | 10/2002 | Ball | 323/282 |
| 6,768,227 B1 * | 7/2004 | Liu | 307/98 |

* cited by examiner

*Primary Examiner*—A. Elamin
(74) *Attorney, Agent, or Firm*—Haynes and Boone, LLP

(57) ABSTRACT

A method of implementing a power-based current limiting circuit in an information handling system includes providing a power supply having an output voltage operating range that can vary between a first voltage output level and a second voltage output level. The power supply output voltage is coupled to a load module via a switch. A power output of the power supply supplied to the load module is detected as a function of the load module current and the output voltage. Lastly, the switch is controlled between a first state and a second state in response to the detected power output.

22 Claims, 3 Drawing Sheets

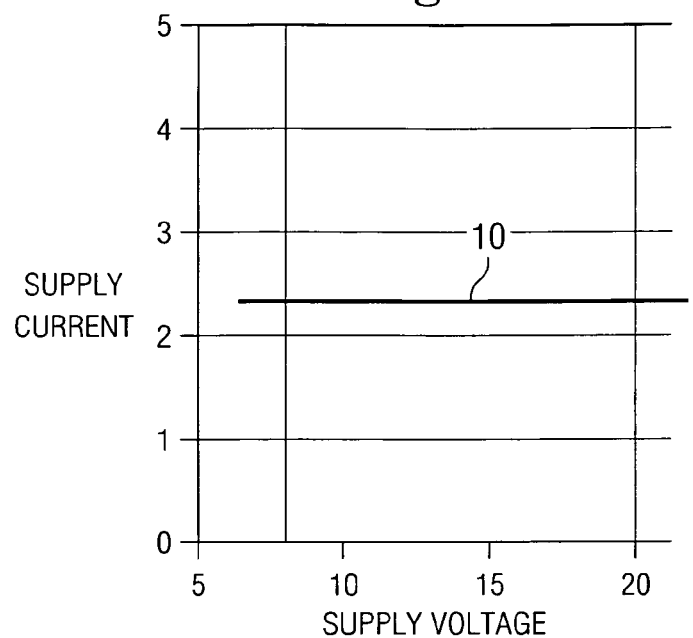
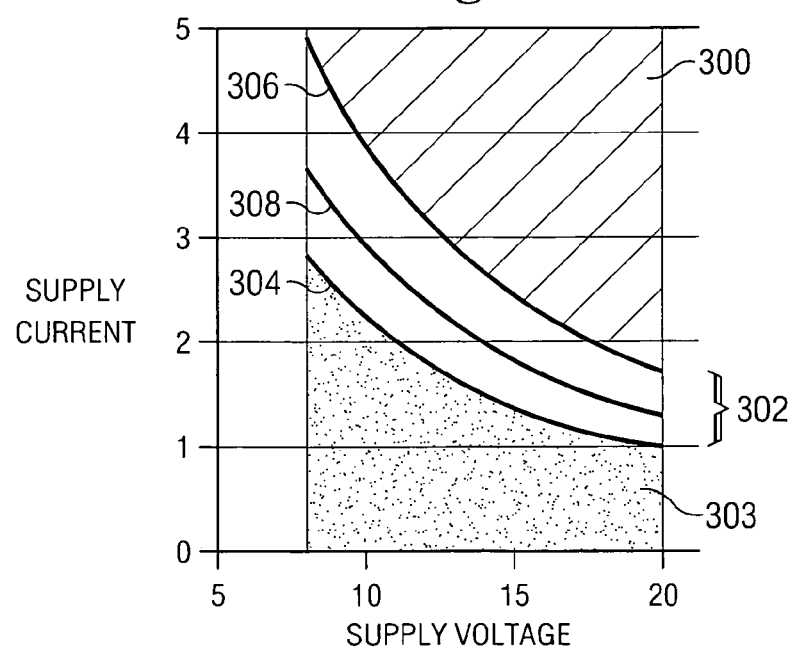

INFORMATION HANDLING SYSTEM FEATURING A POWER-BASED CURRENT LIMITING CIRCUIT

BACKGROUND

The present disclosure relates generally to information handling systems, and more particularly to a method and apparatus for implementing a power-based current limiting circuit in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In conjunction with information handling systems, such as with notebook computers, high power external modules are often powered from an unregulated main power source in the notebook computers to avoid efficiency losses. For instance, in one known notebook computer, a plug-in module inserted into a corresponding bay of the notebook computer can be powered from the main system power rail. However, the main system power rail or supply voltage can vary in voltage from between eight (8) volts and twenty (20) volts.

To protect the module from internal faults and the computer system from excessive power draw, the notebook computer system usually employs a fuse. The fuse interrupts power delivery when excessively high current is detected. Because input voltage varies greatly and the module device in the bay draws constant power, its normal current will vary inversely proportionally with the input voltage. Such large variations in fault currents make it difficult, if not impossible, to design a robust fault protection circuit.

The problem is even more severe for ultra-portable notebook computer systems, where the fuse designed for the lowest battery voltage (e.g., 8 V) causes a system shutdown at the highest AC adapter voltage (e.g., 20 V) due to a power budget limitation in the AC power adapter.

In prior systems, two types of fuses were used to interrupt fault current to an external device. A first type includes a mechanical fuse, based on physical properties of certain materials such as polymer in a polyswitch. A second type included a solid state current-limiting switch, such as a MAX1838, manufactured by Maxim Integrated Products, Inc. of Sunnyvaie, CA. These devices were inserted in the current path between the system power source and the module. If a fault occurred in the module or if an unsupported module was inserted requiring more power than the system can supply, the supply current would be interrupted.

FIG. 1 illustrates a graph representation of supply current to supply voltage of a module in a system using a conventional fuse. In the prior systems, both types of fuse devices are triggered at a preset constant current value, as indicated by reference numeral 10 (for example, 2.2 A). However, selecting a proper trip current can be an impossible task if voltage variations are wide and the system has a very limited power budget (e.g., as in an ultra-portable notebook computer). With the constant current value fuse, any current above the constant current value results in a module fault. Similarly, any current below the constant current value renders the system okay.

Accordingly, it would be desirable to provide a method for improved fault protection in an information handling system absent the disadvantages found in the prior methods discussed above.

SUMMARY

According to one embodiment, a method of implementing a power-based current limiting circuit in an information handling system includes providing a power supply having an output voltage operating range that can vary between a first voltage output level and a second voltage output level. The power supply output voltage is coupled to a load module via a switch. A power output of the power supply supplied to the load module is detected as a function of the load module current and the output voltage. Lastly, the switch is controlled between a first state and a second state in response to the detected power output. An information handling system having a power-base current limiting circuit is also disclosed.

BRIEF DESCRIPTION OF THE DRAWINGS

FIG. 1 illustrates a graph representation of supply current to supply voltage of a module in a system using a conventional fuse;

FIG. 3 illustrates a graph representation of supply current to supply voltage of a module in a system using a power-base fuse/switch according to an embodiment of the present disclosure.

DETAILED DESCRIPTION

According to one embodiment of the present disclosure, a method and system apparatus are disclosed for implementing a power-based current limiting circuit in an information handling system. The method and system can be better understood by reference to the flow charts, drawing figures, and additional discussion included herein.

Figure 2:
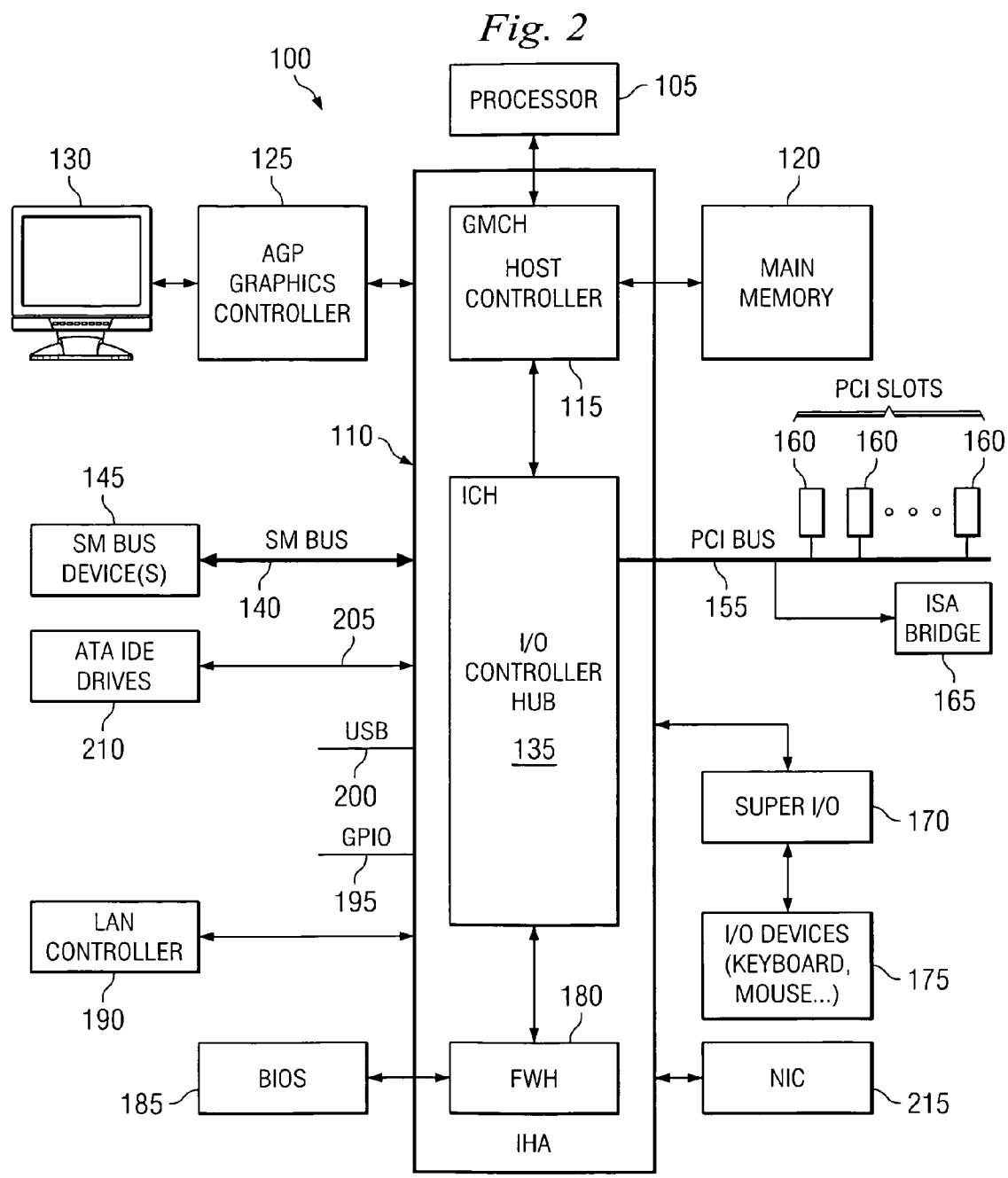
FIG. 2 illustrates a block diagram view of an information handling system having a method and apparatus for implementing a power-based current limiting circuit in an operating system according to an embodiment of the present disclosure.

FIG. 2 depicts a high level block diagram of an information handling system 100 in which the disclosed technology is practiced. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The particular information handling system 100 depicted in FIG. 2 is a portable computer which includes a processor 105. An Intel Hub Architecture (IHA) chip 110 provides system 100 with memory and I/O functions. More particularly, IHA chip 110 includes a Graphics and AGP Memory Controller Hub (GMCH) 115. GMCH 115 acts as a host controller that communicates with processor 105 and further acts as a controller for main memory 120. GMCH 115 also provides an interface to an Advanced Graphics Port (AGP) controller 125 which is coupled thereto. A display 130 is coupled to AGP controller 125. IHA chip 110 further includes an I/O Controller Hub (ICH) 135 which performs numerous I/O functions. ICH 135 is coupled to a System Management Bus (SM Bus) 140 which is coupled to one or more SM Bus devices 145.

ICH 135 is coupled to a Peripheral Component Interconnect (PCI) bus 155 which is coupled to mini PCI connector slots 160 which provide expansion capability to portable computer 100. A super I/O controller 170 is coupled to ICH 135 to provide connectivity to input devices such as a keyboard and mouse 175 as shown in FIG. 1. A firmware hub (FWH) 180 is coupled to ICH 135 to provide an interface to system BIOS 185 which is coupled to FWH 180. A General Purpose I/O (GPIO) bus 195 is coupled to ICH 135. USB ports 200 are coupled to ICH 135 as shown. USB devices such as printers, scanners, joysticks, etc. can be added to the system configuration on this bus. An integrated drive electronics (IDE) bus 205 is coupled to ICH 135 to connect IDE drives 210 to the computer system. In addition, a network interface card (NIC) provides connectivity to a network, for example, the Internet or other computer network.

Referring now to FIG. 3, according to one embodiment of the present disclosure, an ultra-portable 15 W computer with a 50 W power supply can be viewed as having a solution space, indicated by reference numeral 300, in which a module fault can be detected over a full range of operating voltages for the system. The solution space 300 includes a fault detection region 302 bordered between an upper limit of a normal operation for the module and a lower limit of a system down region. The upper limit of the normal operation for the module is indicated by reference numeral 304. The lower limit of the system down region is indicated by reference numeral 306. Below the upper limit 304 of the normal operation, over the range of supply voltages, the module operates in the normal operating range 303 and the system is ok. Above the lower limit 306 of the system down region, the module and/or AC adapter shuts down due to an overload condition and furthermore, the system goes down.

According to one embodiment, a method is provided for detection of a module fault within the solution space for an information handling system. In particular, a power-based fuse/switch is included within the information handling system to implement a power-based current limiting circuit. The power-based current limiting circuit has a curve representation similar to that shown in FIG. 3 and indicated by reference numeral 308. With a conventional fuse, as shown in FIG. 1, it is impossible to stay within solution space 300 of FIG. 3 at a full range of operating voltages for the information handling system. However, the problem of the conventional fuse is overcome with the power-based current limiting circuit of the present embodiments.

Figure 4:
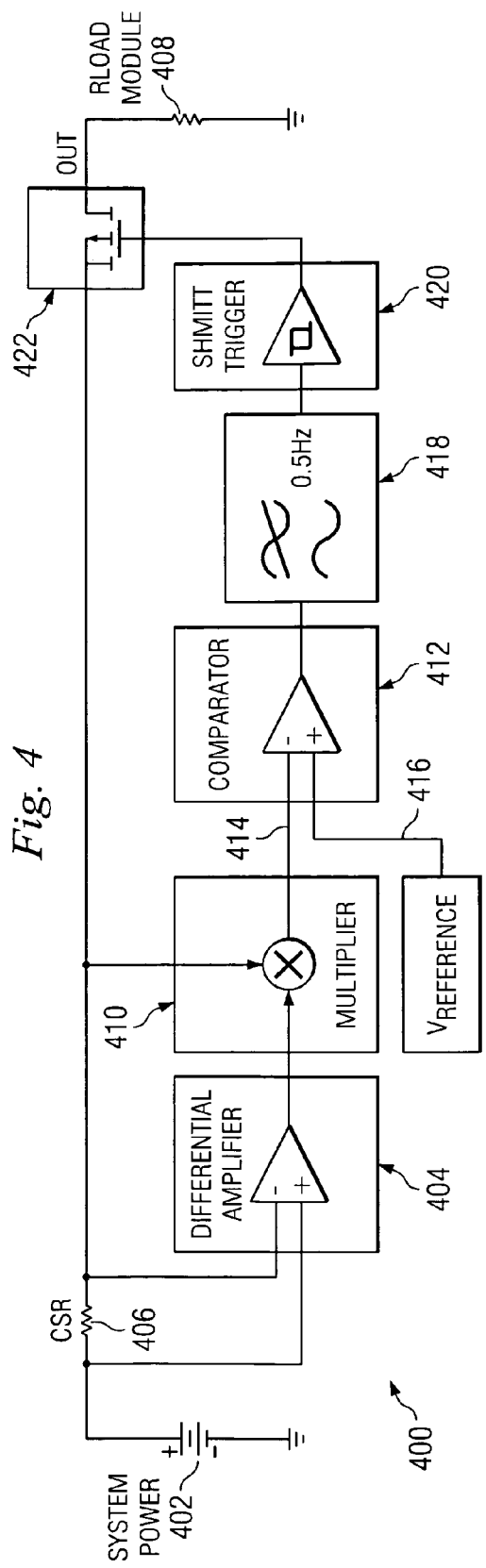
FIG. 4 illustrates a schematic block diagram view of a power-based current limiting circuit according to one embodiment of the present disclosure.

Turning now to FIG. 4, further in conjunction with the embodiments of the present disclosure, the power-based current limiting circuit 400 includes a current interrupting device based on monitoring power consumed by a module. FIG. 4 is a block diagram of such current interrupting device.

System power 402 provides the supply voltage. Input differential amplifier 404 amplifies a voltage drop across a Current Sense Resistor (CSR) 406, thus producing a voltage proportional to the current consumed by the load (i.e., the module) 408. Multiplier 410 multiplies the voltage output of the differential amplifier 404 by the voltage seen on the load terminal 408, thus producing a voltage proportional to power consumed by the load. Comparator 412 receives at an inverting input 414 the multiplier 410 output and at a non-inverting input 416 a reference voltage input. Comparator 412 determines if consumed power is greater than the maximum allowed. Low pass filter 418 filters out transients, thus preventing false tripping of the device 400. Lastly, a Schmitt trigger 420 ensures that there is no instability. The output of the Schmitt trigger 420 control switch device 422, according to the solution space 300 of FIG. 3.

According to another embodiment, the Schmitt trigger 420 can be replaced by a reset-able latch to make sure that the switch 422 is fixed in the OFF position until power is cycled.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of implementing a power-based current limiting circuit in an information handling system, said method comprising:

providing a power supply having an output voltage operating range that can vary between a first voltage output level and a second voltage output level;

coupling the power supply output voltage to a load module via a switch;

detecting a power output of the power supply supplied to the load module as a function of load module current and the output voltage; and controlling the switch between a first state and a second state in response to the detected power; wherein the detected power output occurs within one of three regions corresponding to a normal operation region, a module fault detected region, and a system shutdown overload region.

2. The method of claim 1, wherein controlling the switch includes maintaining power to the load module in response to the detected power output occurring within the normal operation region.

3. The method of claim 1, wherein controlling the switch includes disrupting power to the load module in response to the detected power output occurring within the system shutdown overload region.

4. The method of claim 2, wherein controlling the switch further includes maintaining power to the load module in response to the detected power output occurring within the module fault detected region and below a prescribed power-based current limit established over the operating range between the first voltage output level and the second voltage output level of the power supply output voltage.

5. The method of claim 3, wherein controlling the switch further includes disrupting power to the load module in response to the detected power output occurring within the module fault detected region and above a prescribed power-based current limit established over the operating range between the first voltage output level and the second voltage output level of the power supply output voltage.

6. The method of claim 1, wherein the fault detection region is bordered between an upper limit of the normal operation region and a lower limit of the system shutdown overload region.

7. The method of claim 1, wherein the first state represents a closed state.

8. The method of claim 1, further wherein the second state represents an open state.

9. The method of claim 1, further wherein detecting the power output and controlling the switch are implemented via a power-based current limiting circuit.

10. The method of claim 9, wherein the power-based current limiting circuit includes an input differential amplifier for amplifying a voltage drop across a current sense resistor, thus producing a voltage proportional to the current consumed by the load module, a multiplier for multiplying the voltage output of the differential amplifier by the voltage available on the load module, producing a voltage proportional to power consumed by the load, a comparator for receiving at an inverting input the multiplier output and at a non-inverting input a reference voltage input, wherein the comparator determines if consumed power is greater than a maximum allowed power, a low pass filter for filtering out transients and preventing false tripping of the power-based current limiting circuit, and a Schmitt trigger for ensuring stability, wherein the output of the Schmitt trigger controls the switch.

11. The method of claim 10, wherein the Schmitt trigger is replaced by a reset-able latch, the reset-able latch ensuring that the switch is fixed in the second state until power is cycled.

12. An information handling system implementing bi-directional level translation comprising:
a power supply having an output voltage operating range that can vary between a first voltage output level and a second voltage output level;
a switch for coupling said power supply to a load module; and
a power-based current limiting circuit configured to detect a power output of the power supply supplied to the load module as a function of load module current and the output voltage, wherein said power-based current limiting circuit operates to control said switch between a first state and a second state in response to the detected power output; wherein
the detected power output occurs within one of three regions corresponding to a normal operation region, a module fault detected region, and a system shutdown overload region.

13. The system of claim 12, wherein controlling the switch includes maintaining power to the load module in response to the detected power output occurring within the normal operation region.

14. The system of claim 12, wherein controlling the switch includes disrupting power to the load module in response to the detected power output occurring within the system shutdown overload region.

15. The system of claim 13, wherein controlling the switch further includes maintaining power to the load module in response to the detected power output occurring within the module fault detected region and below a prescribed power-based current limit established over the operating range between the first voltage output level and the second voltage output level of the power supply output voltage.

16. The system of claim 14, wherein controlling the switch further includes disrupting power to the load module in response to the detected power output occurring within the module fault detected region and above a prescribed power-based current limit established over the operating range between the first voltage output level and the second voltage output level of the power supply output voltage.

17. The system of claim 12, wherein the fault detection region is bordered between an upper limit of the normal operation region and a lower limit of the system shutdown overload region.

18. The system of claim 12, wherein the first state represents a closed state.

19. The system of claim 12, further wherein the second state represents an open state.

20. The system of claim 12, wherein said power-based current limiting circuit includes an input differential amplifier for amplifying a voltage drop across a current sense resistor, and producing a voltage proportional to the current consumed by the load module, a multiplier for multiplying the voltage output of the differential amplifier by the voltage available on the load module, producing a voltage proportional to power consumed by the load, a comparator for receiving at an inverting input the multiplier output and at a non-inverting input a reference voltage input, wherein the comparator determines if consumed power is greater than a maximum allowed power, a low pass filter for filtering out transients and preventing false tripping of the power-based current limiting circuit, and a Schmitt trigger for ensuring stability, wherein the output of the Schmitt trigger controls the switch.

21. The system of claim 20, wherein the Schmitt trigger is replaced by a reset-able latch, the reset-able latch ensuring that the switch is fixed in the second state until power is cycled.

22. A system for implementing a power-based current limiting circuit in an information handling system, comprising:
a power supply having an output voltage operating range that can vary between a first voltage output level and a second voltage output level;
a switch coupling the power supply output voltage to a load module;

means for detecting a power output of the power supply supplied to the load module as a function of load module current and the output voltage, wherein said means operates to control said switch between a first state and a second state in response to the detected power output; and wherein said means for detecting includes means for amplifying a voltage drop across a current sense resistor, and producing a voltage proportional to the current consumed by the load module, means for multiplying the voltage output of the differential amplifier by the voltage available on the load module, producing a voltage proportional to power consumed by the load, means for receiving at an inverting input the multiplier output and at a non-inverting input a reference voltage input, wherein the means for receiving determines if consumed power is greater than a maximum allowed power, means for filtering out transients and preventing false tripping of the means for detecting, and a Schmitt trigger for ensuring stability, wherein the output of the Schmitt trigger controls the switch.

* * * * *

UNITED STATES PATENT AND TRADEMARK OFFICE
CERTIFICATE OF CORRECTION

PATENT NO. : 7,065,662 B2  Page 1 of 1
APPLICATION NO. : 10/385096
DATED : June 20, 2006
INVENTOR(S) : Kevin Y. Chen et al.

It is certified that error appears in the above-identified patent and that said Letters Patent is hereby corrected as shown below:

Column 4, Line 67, after "power" insert --output--.

Signed and Sealed this

Seventh Day of August, 2007

JON W. DUDAS
*Director of the United States Patent and Trademark Office*